US012783836B2

(12) United States Patent
Suzuki

(10) Patent No.: US 12,783,836 B2
(45) Date of Patent: Nov. 3, 2026

(54) PRINTING SYSTEM, METHOD, AND STORAGE MEDIUM STORING PROGRAM

(71) Applicant: CANON KABUSHIKI KAISHA, Tokyo (JP)

(72) Inventor: Hiroshi Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 193 days.

(21) Appl. No.: 18/826,424

(22) Filed: Sep. 6, 2024

(65) Prior Publication Data

US 2025/0103838 A1 Mar. 27, 2025

(30) Foreign Application Priority Data

Sep. 27, 2023 (JP) ................................ 2023-166223

(51) Int. Cl.
*G06K 15/16* (2006.01)
*G06K 15/02* (2006.01)
*G06F 3/06* (2006.01)

(52) U.S. Cl.
CPC ......... *G06K 15/16* (2013.01); *G06K 15/1817* (2013.01); *G06F 3/0608* (2013.01)

(58) Field of Classification Search
None
See application file for complete search history.

(56) References Cited

U.S. PATENT DOCUMENTS

| | | | | |
|---|---|---|---|---|
| 10,922,592 | B2 * | 2/2021 | Chuto | G06K 15/1894 |
| 2007/0182778 | A1 * | 8/2007 | Lapstun | B41J 2/04528 347/29 |
| 2012/0200894 | A1 * | 8/2012 | Montierth | G06F 3/1293 358/1.15 |
| 2013/0286139 | A1 * | 10/2013 | Furuki | B41J 2/325 347/217 |
| 2020/0341707 | A1 * | 10/2020 | Iwadate | G06F 3/1245 |

FOREIGN PATENT DOCUMENTS

| | | |
|---|---|---|
| JP | 2008-044122 A | 2/2008 |
| JP | 2011-189509 A | 9/2011 |

* cited by examiner

*Primary Examiner* — Haris Sabah
(74) *Attorney, Agent, or Firm* — VENABLE LLP

(57) ABSTRACT

A printing system includes a data controller and a printing controller. The data controller includes a transmission control unit configured to set, as a group, a piece of image data corresponding to a predetermined unit so as to satisfy a condition and perform transmission control for transmitting data corresponding to the group to the printing controller, wherein the condition is that a size of an image in a conveyance direction is greater than or equal to a threshold.

25 Claims, 9 Drawing Sheets

PRINTING SYSTEM, METHOD, AND STORAGE MEDIUM STORING PROGRAM

BACKGROUND OF THE INVENTION

Field of the Invention

The present invention relates to a printing system for performing printing control, a method in the printing system, and a storage medium storing and a program.

Description of the Related Art

In printers that perform consecutive printing while transferring image data from an image generation unit via a data communication unit, there is a phenomenon in which supply of image data cannot keep up with a sheet feeding speed (hereinafter referred to as "underrun") during print execution and thereby printing cannot be performed. Image data not being supplied in time during print execution is referred to as an underrun, and not being able to perform printing due to an underrun is referred to as an underrun error. If a printer is a digital printer capable of variable printing, in order to perform control on a page basis, data transfer for each page and command communication for performing print setting information notification and print processing instruction are executed during consecutive printing. Therefore, even if a per-unit-size data transfer speed according to a network bandwidth exceeds a printing speed of a printer, an underrun may be caused by addition of a command communication time, which excludes image data transfer, or a software processing time associated with communication.

Regarding an underrun error, monitoring a data transfer status and a buffer status during printing and performing processing such as temporarily stopping printing when occurrence of an underrun is detected or expected is known. Japanese Patent Laid-Open No. 2011-189509 describes transmitting data for measurement from a host apparatus to a printer before printing and, by measuring a time thereof, calculating a data transfer speed, and then at the time of printing, performing, for print page image data, calculation from information of the data transfer speed and a printing speed to predict the occurrence of an underrun error. In Japanese Patent Laid-Open No. 2011-189509, by using that determination result to perform data transfer of only page images for which it is determined that an underrun error will not occur, occurrence of an underrun is prevented.

SUMMARY OF THE INVENTION

The present invention provides a printing system for preventing occurrence of an underrun even when data for which an underrun may occur is included, a method, and a storage medium storing a program.

The present invention in one aspect provides a printing system comprising: a data controller; and a printing controller, the data controller including: at least one processor and at least a memory coupled to the at least one processor and having instructions stored thereon, and when executed by the at least one processor, acting as: a transmission control unit configured to set, as a group, a piece of image data corresponding to a predetermined unit so as to satisfy a condition and perform transmission control for transmitting data corresponding to the group to the printing controller, wherein the condition is that a size of an image in a conveyance direction is greater than or equal to a threshold, and the printing controller including: at least one processor and at least a memory coupled to the at least one processor and having instructions stored thereon, and when executed by the at least one processor, acting as: a storage unit configured to receive the data corresponding to the group from the data controller and store the data corresponding to the group in a buffer region; an obtaining unit configured to obtain the piece of image data from the data corresponding to the group stored in the buffer region; and a print control unit configured to perform printing control for causing a printing unit to perform printing based on the piece of image data obtained by the obtaining unit.

According to the present invention, it is possible to prevent occurrence of an underrun even if data for which an underrun may occur is included.

Further features of the present invention will become apparent from the following description of exemplary embodiments with reference to the attached drawings.

DESCRIPTION OF THE EMBODIMENTS

Figure 1:
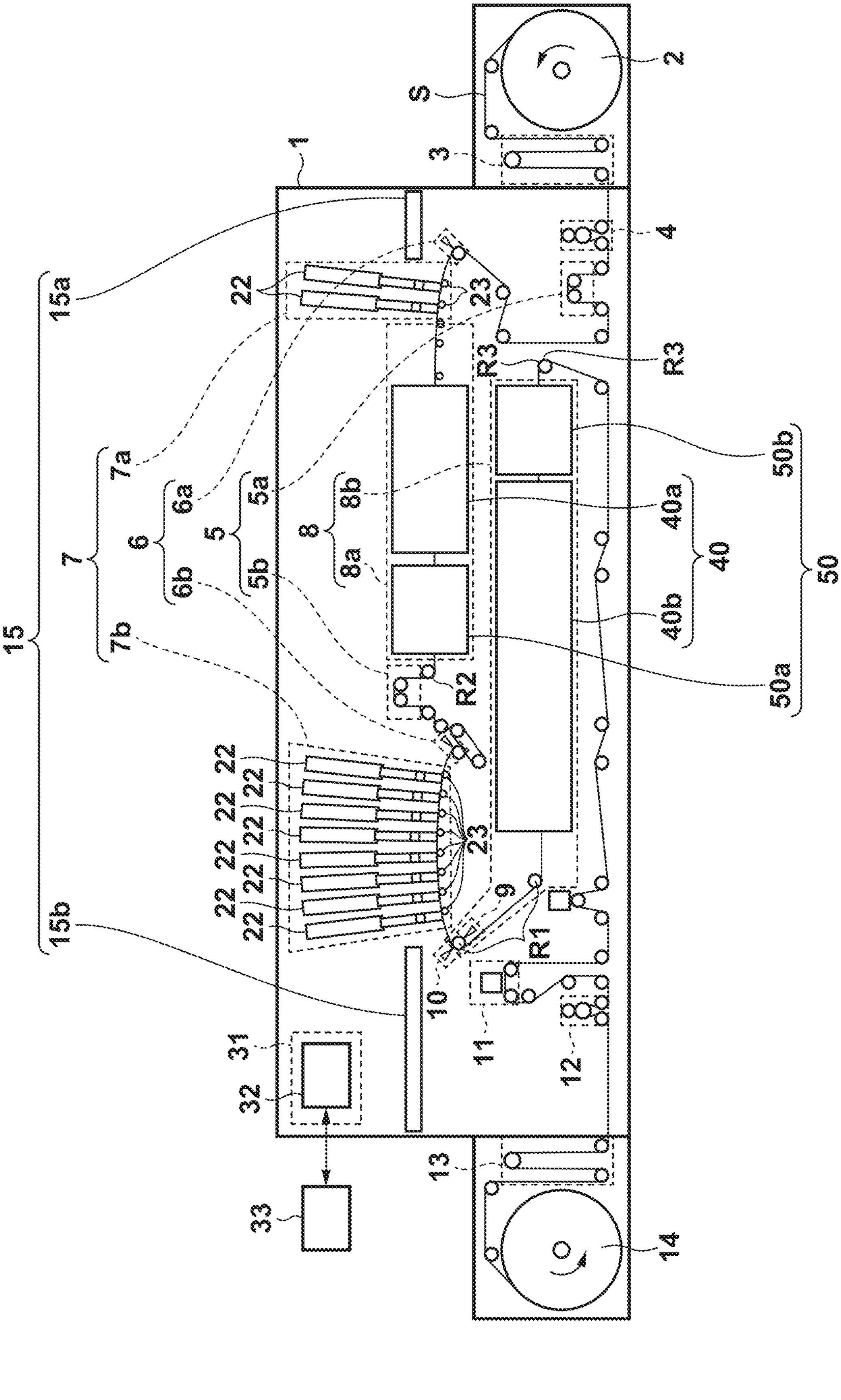
FIG. 1 is a schematic cross-sectional view illustrating an internal configuration of a printing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Even if an underrun is prevented, if there is missing image data in a printed product, the printed product may not be recognized as a product. In such a case, an extensive redo such as a reprint after modifying page image data of a job such that it will not be determined that there may be an underrun ends up being performed.

According to the present disclosure, it is possible to prevent occurrence of an underrun even if data for which an underrun may occur is included.

First Embodiment

FIG. 1 is a schematic cross-sectional view illustrating an internal configuration of a printing apparatus 1. An up direction in FIG. 1 is defined as an up direction, a left-right direction in FIG. 1 is defined as a lengthwise direction, and a direction orthogonal to a printing medium conveyance direction, that is, a direction from a near side to a far side is defined as a sheet width direction. The printing apparatus 1 is a high-speed line printer that uses a continuous sheet wound into a roll as a printing medium. Respective units, which are an unwinding roll unit 2, a first dancer unit 3, a first main conveyance unit 4, a meandering correction unit 5, a conveyance detection unit 6, a printing unit 7, a conveyance tension detection unit 9, a printed image position detection unit 10, a scanner unit 11, a second main conveyance unit 12, a second dancer unit 13, a winding roll unit 14, a maintenance unit 15, a drying unit 40, and a cooling unit 50, are provided inside the printing apparatus 1. A continuous sheet S, which is a printing medium, is conveyed along a sheet conveyance path indicated by a solid line in the drawing, and processing is performed in each unit.

The printing apparatus 1 includes a first printing process and a second printing process along a sheet conveyance path (sheet S). In the first printing process, an image is printed by being fixed onto the sheet S through a first printing unit 7*a*, a first drying unit 40*a*, and a first cooling unit 50*a*. In the second printing process, an image is printed by being fixed onto the sheet S, which has gone through the first printing process, through a second printing unit 7*b*, a second drying unit 40*b*, and a second cooling unit 50*b*. As described above, the printing apparatus 1 can consecutively print an image on the sheet S by causing the sheet S to go through the above first printing process and second printing process. The printing apparatus 1 may selectively determine a printing process according to a printing condition. In that case, an image is printed on the sheet S only through a selected printing process.

The unwinding roll unit 2 is a unit for holding and feeding a continuous sheet wound into a roll. The unwinding roll unit 2 is configured to store an unwinding roll and pull out and supply the sheet S. The present invention is not limited to being capable of storing one roll and may be configured to store two, three, or more rolls and selectively pull out and supply the sheet S.

The first dancer unit 3 is a unit for applying a constant sheet tension between the unwinding roll unit 2 and the first main conveyance unit 4. In the first dancer unit 3, sheet tension is applied by a tensioning mechanism (not illustrated).

The first main conveyance unit 4 is a unit for feeding the sheet S to each unit provided along the sheet conveyance path (sheet S) and applying sheet tension between itself and the second main conveyance unit 12. The first main conveyance unit 4 rotates by being driven by a motor (not illustrated) and performs tension conveyance of the sheet S.

The meandering correction unit 5 is a unit for correcting meandering in the sheet width direction during tension conveyance of the sheet S. Regarding the meandering correction unit 5, a first meandering correction unit 5*a* and a second meandering correction unit 5*b* are each provided on an upstream side of their respective printing process in the sheet conveyance path. The meandering correction unit 5 is configured to include a meandering correction roller and a meandering detection sensor (not illustrated) for detecting meandering of the sheet S. The meandering correction roller can change an inclination relative to the sheet S by a motor (not illustrated) and corrects meandering of the sheet S based on a measurement result of the meandering detection sensor. By causing the sheet S to wrap around the meandering correction roller, a meandering correction function is enhanced.

The conveyance detection unit 6 is a unit for detecting a conveyance speed of the sheet S and a mark printed in advance on the sheet S to control an image forming timing of the printing unit 7. Regarding the conveyance detection unit 6, a first conveyance detection unit 6*a* and a second conveyance detection unit 6*b* are each provided on an upstream side of their respective printing process in the sheet conveyance path. The first conveyance detection unit 6*a* and the second conveyance detection unit 6*b* are used to control an image forming timing of the first printing unit 7*a* and an image forming timing of the second printing unit 7*b*, respectively.

The printing unit 7 is a sheet processing unit for forming an image by applying a liquid composition (ink) onto the conveyed sheet S from above using print heads 22. A conveyance path in the printing unit 7 is formed by guide rollers 23 arranged in an upward convex arc shape, and by a constant tension being applied to the sheet S, a clearance between the sheet S and the print heads 22 is ensured. Regarding the print heads 22, a plurality of print heads are arranged along the conveyance direction. The first printing unit 7*a* includes a total of two line-type print heads corresponding to white (W) ink and a reactive liquid. The second printing unit 7*b* includes a total of 8 line-type print heads corresponding to a reactive liquid and three special colors in addition to four colors of black (Bk), yellow (Y), magenta (M), and cyan (C). A reactive liquid is a liquid containing a component that increases the viscosity of ink. Here, an increase in the viscosity of ink is a state in which a coloring material, resin, or the like constituting the ink contacts a component that increases the viscosity of ink and thereby causes a chemical reaction or physical adsorption to take place and the viscosity of the ink to increase. An increase in the viscosity of ink is not limited to an increase in the viscosity of all of the ink and also includes a case where there is a local increase in viscosity due to partial aggregation of components constituting the ink such as a coloring material or resin. The component that increases the viscosity of ink may be a metal ion, a polymer coagulant, or the like and is not particularly limited; a substance that coagulates a coloring material in the ink by inducing a change in pH of the ink can be used, and an organic acid can be used. When a reactive liquid is applied before ink is applied onto the sheet S, ink that has reached the sheet S can be immediately fixed. Thus, it is possible to prevent bleeding in which adjacent inks mix with each other. A color type, the number of colors, and the number of the print heads 22 are not limited. Regarding an inkjet printing method, a method in which a heating element is used, a method in which a piezo element is used, a method in which an electrostatic element is used, a method in which a Micro Electro Mechanical Systems (MEMS) element is used, and the like can be adopted. Inks are supplied from ink tanks (not illustrated) to the print heads 22 via ink tubes.

The conveyance tension detection unit 9 is a unit for detecting tension when tension conveyance between the first main conveyance unit 4 and the second main conveyance unit 12 is performed. The printed image position detection unit 10 is a unit for detecting a shift of an image formed on the sheet S by the printing unit 7 during printing and correcting printing. A wrap guide roller R1 is a roller that causes a surface of the sheet S downstream of the second printing unit 7*b* in terms of conveyance that is opposite to an ink-applied surface to wrap at a constant wrap angle. Two wrap guide rollers R1 are arranged between the second printing unit 7*b* and the second drying unit 40*b*, the sheet S is turned around so as to be substantially parallel to itself in the top and bottom of the apparatus, and the second drying unit 40*b* is arranged below the printing unit 7*b* in the apparatus.

The drying unit 40 (first drying unit 40*a* or second drying unit 40*b*) is a unit for reducing liquid components included in the liquid composition applied onto the sheet S in the printing unit 7 and enhances fixability between the sheet S and the ink. The drying unit 40 blows air on the printed sheet S and thereby dries the applied ink. The drying unit 40 applies wind on the passing sheet S from at least the ink-applied surface side and thereby dries the ink-applied surface of the sheet S. In addition to the method of applying wind, the drying method may be configured by combining a method of irradiating an electromagnetic wave (ultraviolet rays, infrared rays, etc.) onto a surface of the sheet S and a conductive heat transfer method in which contact of a heating element is used.

The cooling unit 50 (first cooling unit 50*a* or second cooling unit 50*b*) cools the sheet S for which fixing has been performed in the drying unit 40, solidifies the softened ink, and suppresses a temperature change amount of the sheet S in a downstream process of the printing apparatus 1. The cooling unit 50 applies wind whose temperature is lower than that of the sheet S on the passing sheet S from at least the ink-applied surface side and thereby cools the ink-applied surface of the sheet S. The cooling method is not limited to the method of applying wind and may be a conductive heat transfer method in which contact of a heat dissipation member is used or may be configured by combining these.

The scanner unit 11 is a unit for reading a test image formed on the sheet S by the printing unit 7 before actual printing, detecting a shift and a density of the image, and correcting actual printing. The second main conveyance unit 12 is a unit for performing sheet conveyance while applying tension to the sheet S between itself and the first main conveyance unit 4 and for adjusting the tension of the sheet S. The second main conveyance unit 12 rotates by being driven by a motor (not illustrated) and, using a tension control unit (not illustrated), controls the speed of the second main conveyance unit 12 according to a value of tension detected by the conveyance tension detection unit 9. As an additional configuration for adjusting the tension of the sheet S, a configuration in which the tension of the sheet S is adjusted by a clutch (not illustrated) capable of controlling drivably-coupled torque may be added. In this case, as tension control methods, there are two methods, which are a torque control method of controlling a value of torque transmitted from the clutch and a speed control method of controlling the roller speed of the second main conveyance unit 12, and the tension control methods can be switched according to the purpose, or the two can be used simultaneously.

The second dancer unit 13 is a unit for applying a constant sheet tension between the second main conveyance unit 12 and the winding roll unit 14. In the second dancer unit 13, sheet tension is applied by a tensioning mechanism (not illustrated). The winding roll unit 14 is a unit for winding the sheet S on which print processing has been performed around a winding core. The roll capable of collection is not limited to one, and a configuration in which there are two, three, or more winding cores and these are selectively switched and collect the sheet S may be taken. Depending on contents of processing after printing, rather than the configuration in which the continuous sheet is wound around the winding core, a configuration in which the continuous sheet is cut using a cutter and the cut sheets S are stacked may be taken.

A control unit 31 is a unit responsible for controlling each unit of the entire printing apparatus 1. The control unit 31 includes a CPU, a storage device, a controller provided with various control units, an external interface, and an operation unit 32 with which a user performs input and output. The operation of the printing apparatus 1 is controlled based on a command from the controller or a host apparatus 33 such as a host computer (information processing apparatus) connected to the controller via the external interface. The host apparatus 33 may be a Digital Front End (DFE) that performs RIP processing and the like outside the printing apparatus 1.

The maintenance unit 15 is a unit provided with a mechanism for recovering the discharge performance of the print heads 22. As such mechanisms, there are, for example, a cap mechanism for protecting ink discharge surfaces of the print heads 22, a wiper mechanism for wiping the ink discharge surfaces, and a suction mechanism for suctioning ink inside the print heads 22 from the ink discharge surfaces using negative pressure. Further, the maintenance unit 15 is provided with a driving mechanism and a rail (not illustrated) and can be moved back and forth in a horizontal direction along the rail and moves directly below the print heads 22 at the time of maintenance of the print heads 22 and moves to a position withdrawn from being directly below the print heads 22 when a maintenance operation is not performed. In the present embodiment, a first maintenance unit 15*a* and a second maintenance unit 15*b* corresponding to the first printing unit 7*a* and the second printing unit 7*b*, respectively, are provided.

Figure 2:
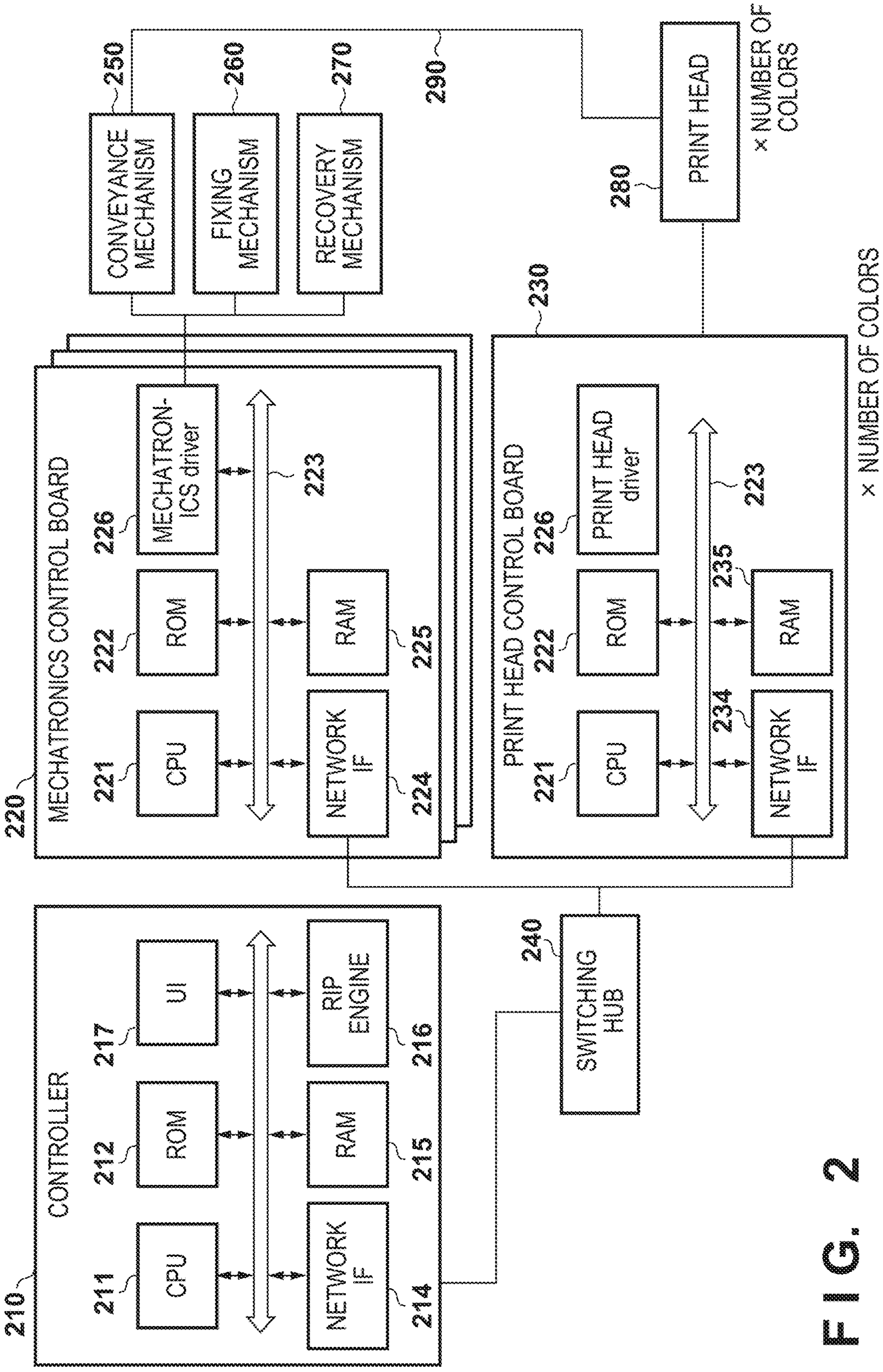
FIG. 2 is a block diagram illustrating a configuration of control hardware of the printing apparatus.

FIG. 2 is a block diagram illustrating an example of a configuration of a printing system of the printing apparatus 1. The printing apparatus 1 includes a controller 210, a mechatronics control board 220, and a print head control board 230 as control hardware constituting the printing system. The controller 210 has a role of issuing instructions to the mechatronics control board 220 and the print head control board 230 to control the entire printing apparatus 1 and roles such as print job control and RIP processing of image data. The controller 210 also operates as a data controller for controlling transmission of image data to the print head control board 230. As a configuration of the controller 210, a CPU 211, a ROM 212, a UI 217, a network IF 214, a RAM 215, and an RIP engine 216 are included, and each communicates via an internal bus 213. The CPU 211 loads a control program stored in the ROM 212 to the RAM 215 and performs control of input from and output to the user via the UI 217, RIP processing of image data using the RIP engine 216, and the like. The ROM 212 is used, for example, as a location for storing image data for when spooling image data. The RAM 215 is used, for example, as a location for temporarily storing image data loaded from the ROM 212. The network IF 214 is an IF module for performing LAN communication and is used for command communication with the mechatronics control board 220 or the print head control board 230 or for image data transfer processing. The controller 210 corresponds to the control unit 31 of FIG. 1, and the UI 217 corresponds to the operation unit 32.

The mechatronics control board 220 performs control of each of a conveyance mechanism 250 for performing sheet conveyance, a fixing mechanism 260 for performing processing for fixing an image after printing, and a recovery mechanism 270 for performing a maintenance operation for maintaining the ink discharge performance of print heads 280 at a good level. The fixing mechanism 260 corresponds to the drying unit 40 and the cooling unit 50 of FIG. 1. The recovery mechanism 270 corresponds to the maintenance unit 15 of FIG. 1. A print head 280 corresponds to a print head 22 of FIG. 1. The mechatronics control board 220 includes a CPU 221, a ROM 222, a network IF 224, a RAM 225, and a mechatronics driver 226, and each communicates via an internal bus 223. The CPU 221 loads a control program stored in the ROM 222 to the RAM 225 and controls each mechanism via the mechatronics driver 226. The network IF 224 is an IF module for performing LAN communication and performs command communication with the controller 210. Regarding the mechatronics control board 220, depending on the configuration and scale of the mechanism of each control target, a configuration in which there are a plurality of units may be taken.

The print head control board 230 serves as a printing controller for performing control for driving a print head 280 for discharging ink and control for data flow of receiving image data from the controller 210 and transferring the data to the print head 280. The print head control board 230 includes a CPU 231, a ROM 232, a network IF 234, a RAM 235, and a print head driver 236, and each communicates via an internal bus 233. The CPU 231 loads a control program stored in the ROM 232 to the RAM 235 and controls the print head 280 via the print head driver 236. The network IF 234 is an IF module for performing LAN communication and performs command communication with the controller 210 and receives image data from the controller 210. The RAM 235 is used, for example, as a received data buffer region for temporarily storing image data transferred from the controller 210. The print head control board 230 has a configuration in which there is one unit for each print head 280. That is, when one print head 280 is configured for one color of ink, a configuration that includes as many print head control boards 230 as the number of ink colors is taken.

A print trigger signal line 290 is a signal line for connecting the conveyance mechanism 250 and the print head 280 and has a role of transmitting an ink discharge timing signal corresponding to the conveyance speed or a page start trigger signal for printing as hardware control signals.

In the present embodiment, a configuration in which the controller 210 communicates with the print head control board 230 inside the printing apparatus 1 will be described. This is, for example, a configuration in which an image data generation module and a print head control module are arranged in the same electronic substrate and communicate via an internal bus of the substrate. The controller 210 and the print head control board 230 may be configured to communicate via a network between apparatuses such as a switching hub 240. This is, for example, a configuration in which the controller 210 is provided in the host apparatus 33 and the print head control board 230 is provided in the printing apparatus 1.

Figure 3:
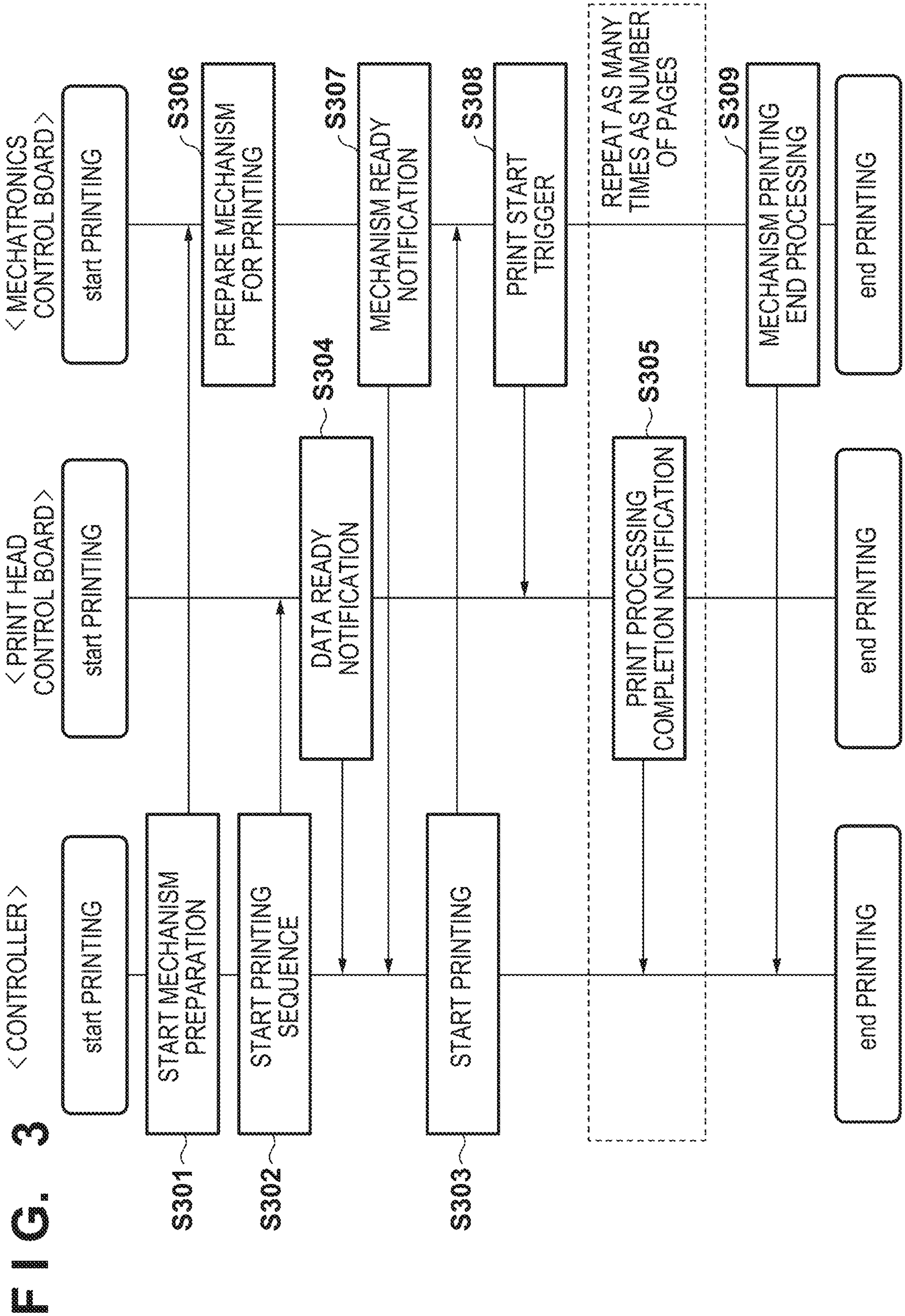
FIG. 3 is a diagram illustrating a printing sequence among pieces of control hardware.

Next, an overall printing sequence in the above device configuration and control hardware configuration will be described with reference to FIG. 3. As illustrated in the drawing, the sequence of FIG. 3 is executed among the controller 210, the mechatronics control board 220, and the print head control board 230. The processing of the controller 210 is executed by the CPU 211. The processing of the mechatronics control board 220 is executed by the CPU 221. The processing of the print head control board 230 is executed by the CPU 231. The sequence of FIG. 3 is started based on a print job being inputted to the controller 210 and a print start instruction by the user being received. At this time, advanced print settings are determined. The print settings are, for example, information of an ink color to be used, a setting related to image processing such as a parameter table to be used for image processing, and a setting related to a mechanical operation such as a setting for a sheet conveyance speed and the temperature of the drying unit. In the present embodiment, as one example, it is assumed that a print start instruction for variable printing in which an image corresponding to a page (logical page) is printed on a printing medium such as a roll paper is received.

In step S301, the controller 210 transmits a print start instruction to the mechatronics control board 220. At this time, the controller 210 transmits information of settings related to a mechanical operation to the mechatronics control board 220. In step S306, upon receiving the information of the print start instruction and the setting related to a mechanical operation transmitted from the controller 210, the mechatronics control board 220 performs a print preparation operation (initialization operation) of the mechanisms. The print preparation operation by the mechatronics control board 220 includes initialization processing of the conveyance mechanism 250, temperature control of the fixing mechanism 260, a print head 280 cap open operation of the recovery mechanism 270, and the like. In step S307, upon completing the initialization operation, the mechatronics control board 220 transmits a mechanism ready notification to the controller 210.

After step S301, in step S302, the controller 210 starts the printing sequence. Here, the printing sequence, which includes data flow control to be described later, is started. Although details will be described later, in the data flow control, image data is transferred one after another from the controller 210 to the print head control board 230.

When the printing sequence starts, the controller 210 transfers image data to the print head control board 230. In step S304, upon accumulation of data in the received data buffer region on the RAM 235 or completion of reception of data of the last page, the print head control board 230 transmits a data ready notification to the controller 210.

Upon receiving the data ready notification transmitted in step S304 and the mechanism ready notification transmitted in step S307, in step S303 the controller 210 transmits the print start instruction to the mechatronics control board 220. Upon receiving the print start instruction, in step S308 the mechatronics control board 220 performs a print start operation. The print start operation includes, for example, controlling the conveyance mechanism 250 such that the sheet conveyance speed is a speed at the time of printing. When performing the print start operation, the mechatronics control board 220 transmits a print start trigger to the print head 280. The print start trigger is a signal transmitted via the print trigger signal line 290. Upon receiving the print start trigger, the print head 280 performs, on a sheet, image formation in which ink discharge is performed, one page at a time. In step S305, the print head control board 230 transmits a print processing completion notification to the controller 210 when page basis ink discharge is completed.

The processing of step S305 of FIG. 3 is repeated until the final page. Upon the mechatronics control board 220 detecting that the conveyance mechanism 250 has wound the final page up to the winding roll unit 14, in step S309 the mechatronics control board 220 transmits a mechanical print completion notification to the controller 210. Then, the controller 210, the mechatronics control board 220, and the print head control board 220 execute processing for when ending printing, processing for transitioning to a standby state, and the like. This concludes the overall flow of printing.

Here, an underrun that occurs during printing will be described. Image data not being supplied in time during print execution is referred to as an underrun, and not being able to perform printing due to an underrun is referred to as an underrun error. The printing apparatus 1 performs image formation by performing ink discharge in the printing unit 7 while conveying the sheet at a constant speed. If image data of a corresponding page is not ready in the print head 280 by the time a page start position on a sheet reaches the printing unit 7, an underrun will occur, and image formation will not be appropriately performed. In the present embodiment, before printing is started, in step S304 a state in which several pages' worth of image data is stored in the received data buffer region of the print head control board 230 is entered. During printing, the image data in the received data buffer region is processed each time image formation is performed, but by image data being transmitted from the controller 210 in parallel, image data is replenished in the received data buffer region. By there being the received data buffer region, an underrun will not immediately occur even if the data transfer speed temporarily falls below the print speed during printing. When a state in which the data transfer speed falls below the printing speed continues, the amount of image data in the received data buffer region decreases, and at some point, an underrun occurs. Hereinafter, one page unit's worth of image data may be referred to as page image data.

The following two strategies are conceivable as basic strategies for preventing an underrun. One is a configuration in which it is ensured that the size of the received data buffer region of the print head control board 230 is large enough and printing starts after receiving as much page image data as possible in step S304 of FIG. 3. The other is a configuration in which the image data transfer speed is made to exceed the printing speed. In the former, by ensuring that the size of the received data buffer region amounts to the size of image data of all pages of a print job and starting printing after image data of all pages have been transferred in advance, it is possible to prevent an underrun. However, there are problems of increased cost and increased physical size due to an increase in the capacity of the RAM 235 of the print head control board 230. In addition, there is a problem that a maximum number of pages cannot be estimated in a printing apparatus capable of consecutive printing by continuous input of jobs such as variable printing. Meanwhile, regarding the latter, it is not necessary to estimate a maximum number of pages, and so, it is more suitable for the printing apparatus 1 of the present embodiment, which is capable of consecutive printing.

The above configuration in which the image data transfer speed is made to exceed the printing speed will be described. It is assumed that the printing apparatus 1 in the present embodiment is a digital printing apparatus capable of variable printing. In variable printing, usually an image size and print settings are decided on a page basis. In addition, printing cancellation, printing result management, and the like are all performed in predetermined units, which is a page. Therefore, the print processing is basically controlled on a page basis. One page's worth of image data is transferred from the controller 210 to the print head control board 230, and print processing is further executed for the print head 280. To do so, in addition to network transfer of the image data itself, network communication of a plurality of commands such as a notification of setting information related to data transfer of a page, a notification of allocation of free space of the received data buffer region, a notification of completion of data transfer, and software processing associated therewith are necessary. That is, in order to prevent an underrun, it is necessary that a time, for which in addition to a time for network transfer of image data a command communication time and a software processing time associated therewith has been added, to be less than a time based on the printing speed. With the above, in order to prevent an underrun, it is necessary to satisfy a condition of a relational expression expressed by the following Equation (1).

$$(1/N)\times D+S\leq(1/V)\times X \tag{1}$$

N: network transfer speed ([byte/sec])

D: image data size ([byte])

S: command communication and software processing time excluding data transfer time ([sec])

V: sheet conveyance speed ([pixel/see])

X: lengthwise size of image ([pixel])

$(1/V)\times X$ is the time it takes to convey a sheet, and $(1/N)\times D+S$ is the time it takes to complete data transfer. Further, the image data size D is expressed as $D=d\times X$, assuming that d is a per-unit-size data size in the lengthwise direction (conveyance direction). D corresponds to the number of image lines.

Figure 10:
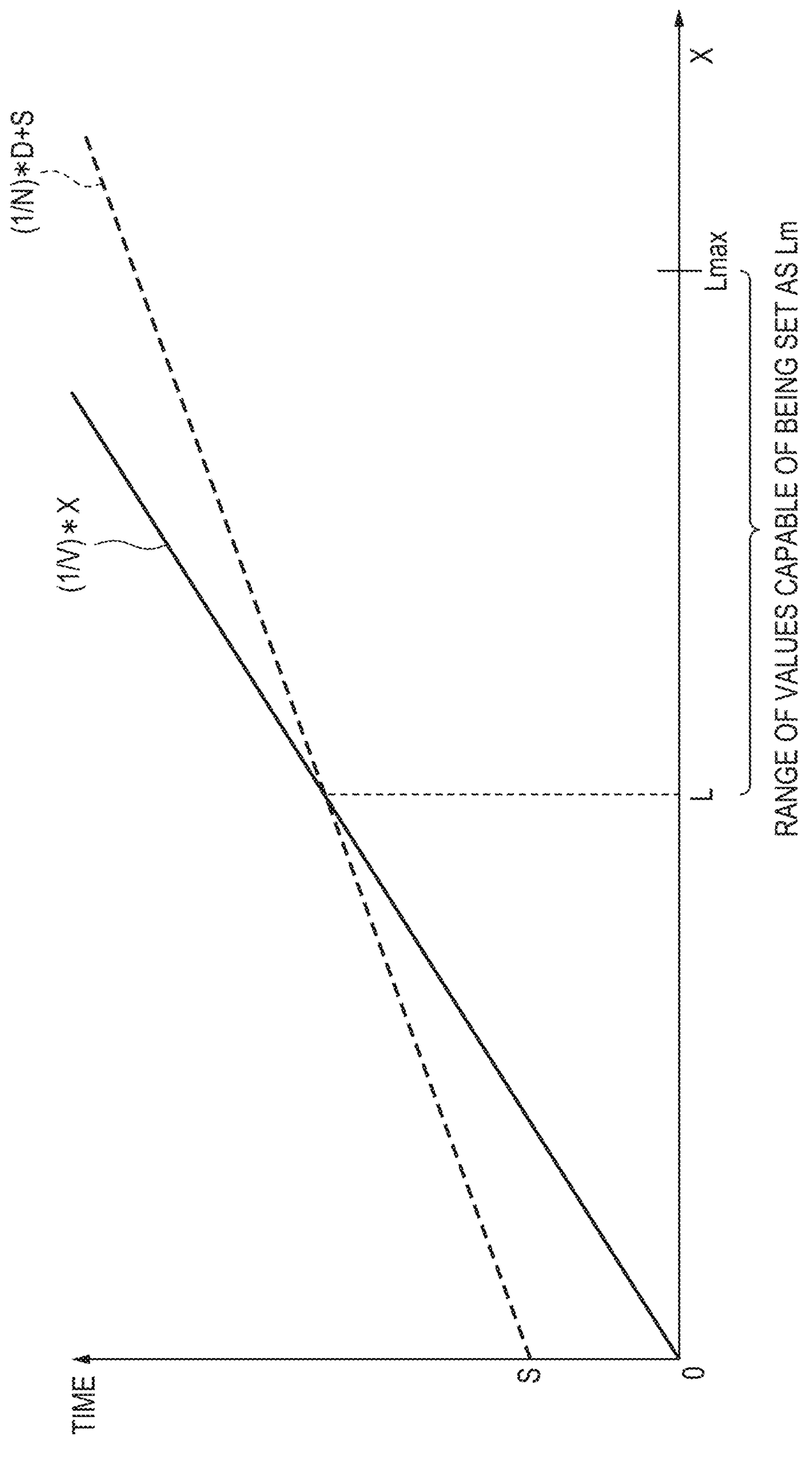
FIG. 10 is a diagram for explaining a condition for preventing an underrun.

The per-unit-size data size d in the lengthwise direction is a value determined by a widthwise size of an image and a data size per pixel. In the present embodiment, when determining the condition, the widthwise size is set to be a fixed value of a maximum size that can be supported by the printing apparatus 1, and the data size per pixel is also set to be a fixed value of a maximum size that can be supported by the printing apparatus 1. When the left-hand side and the right-hand side of Equation (1) are plotted under such premise, they are as illustrated in FIG. 10. As illustrated in FIG. 10, the sheet conveyance time and the data transfer completion time increases or decreases depending on the X value of image data, but the command communication and software processing time S, which excludes the data transfer time, is constant regardless of the data size. In addition, it can be seen that the condition of Equation (1) is satisfied when the X value is larger than an X value (=L) at which the two plotted lines intersect. That is, if the X value of image data of a page is greater than or equal to L, an underrun is avoided, and if it is less than L, an underrun may be caused.

Hereinafter, processing for combining and transferring image data that is to be executed in the printing sequence of step S302 will be described. As described above, as illustrated in FIG. 10, a page whose X value less than L corresponds to a condition in which the image data transfer speed falls under the printing speed, that is, an underrun may be caused. Therefore, in the present embodiment, for a page whose X value is less than L, the X value of the next page is added. If the added X values are less than L, the X value of the next page is further added, and a page group whose added X values are greater than or equal to L is decided. When performing image data transfer from the controller 210 to the print head control board 230, pieces of page image data included in a page group are combined in a contiguous memory space on the RAM 215 in the order of pages to be printed and transferred as one piece of combined data. Information of a group of pages to be combined is added to a data transfer setting information notification command.

Then, the print head control board 230 divides the received page data into individual pieces of page image data and controls the print processing for the print head 280 on a page basis.

In the present embodiment, by performing the data combining transfer processing as described above, it is possible to perform data transfer that satisfies an underrun avoidance condition and perform printing control on a page basis even in a print job that includes image data whose X value is small. The above page group will be referred to as a combined data group below.

Figure 9:
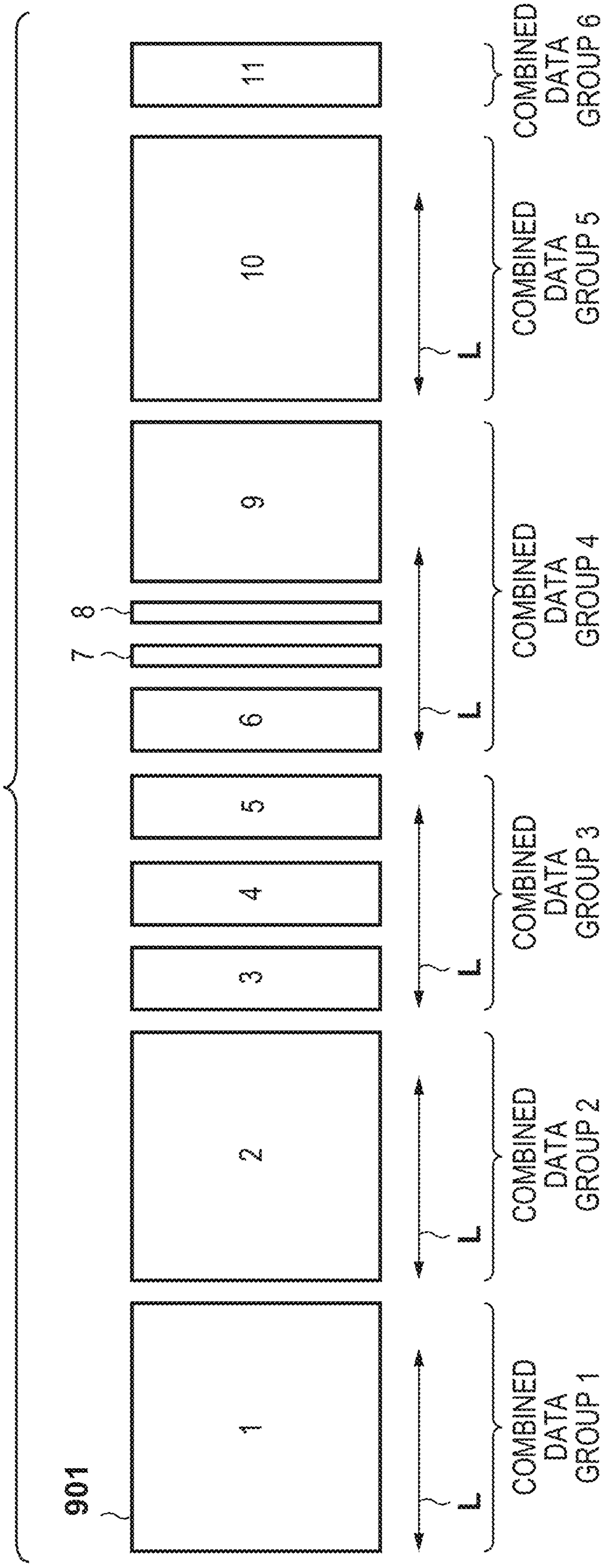
FIG. 9 is a diagram for explaining generation of a combined data group.

An example of generating a combined data group in which pieces of image data are combined with each other will be described with reference to FIG. 9. A page image 901 is a schematic diagram of image data on a page basis, and the horizontal direction represents a length (=X) in the lengthwise direction. A number noted inside each page image 901 represents a page number. The page number here represents an order in which printing is performed on a sheet and does not represent a page number in the print job. That is, if a job is to be printed consecutively on a sheet, it is processed as consecutive pages. For example, all of the first to eleventh pages of FIG. 9 may be one job, the first to second pages, the third to sixth pages, and the seventh to eleven pages may each be a separate job, or each page may be a separate job. Regarding a page whose X value is greater than or equal to L, that page alone will be a single piece of combined data group. In FIG. 9, the first, second, and tenth pages correspond thereto. A page whose X value is less than L is combined with the next page to form a combined data group such that the sum of X values is greater than or equal to L. In FIG. 9, the third, fourth, and fifth pages form one combined data group, and sixth, seventh, eighth, and ninth pages form one combined data group. Further, regarding the eleventh page, although the X value is less than L, since there is no subsequent page, a combined data group whose sum of X values is greater than or equal to L cannot be formed. In such a case, even if the sum of X values is less than L, it is assumed as one combined data group, and data transfer is performed. The last combined data group does not satisfy the underrun avoidance condition. However, since an immediately prior data transfer satisfies the underrun avoidance condition, image data is buffered in the received data buffer region of the print head control board 230, and so long as data transfer can be performed before a buffer of the received data buffer region is emptied, an underrun is avoided. Therefore, even if the last combined data group is a group that does not satisfy that the sum of X values is greater than or equal to L, since it is highly likely that image data whose X value is greater than or equal to L remains in the received data buffer region of the print head control board 230, it is possible to prevent an underrun during printing. Thus, in the present embodiment, before the start of printing, image data is grouped such that an X value is greater than or equal to L.

In addition, regarding the condition L for forming a combined data group, a larger value (to be Lm) may be set by adding a margin value. However, if the data size of a combined data group exceeds the size of the received data buffer region of the print head control board 230, data transfer cannot be performed, and so, the value is within that constraint.

A maximum X value of one page in the printing apparatus 1 is Xmax [pixel], and the size of the received data buffer region of the print head control board 230 is B [byte]. An upper limit of Lm is Lm that satisfies d*(Lm+Xmax)=B. This equation assumes a case where, when forming a combined data group, a page whose X value is less than Lm and an image whose X value is Xmax are combined and the width direction of the image is a maximum, and a condition is such that, even in that case, the combined data size is less than or equal to B. Here, Xmax may be decided from the size of the ROM 212 and the RAM 215 of the controller 210, the structural constraints of the print head 280, and the like. In FIG. 10, the upper limit of Lm is indicated as Lmax. Values that can be set as Lm are between L and Lmax on the X-axis in the graph. The value of the condition L may be incorporated into a program in the controller 210 or the print head control board 230 using a value calculated based on a theoretical value as a fixed value or may be dynamically calculated in the program at the start of printing based on setting value information of the sheet conveyance speed V at the start of printing. Alternatively, a configuration may be taken so as to measure a network communication speed in a process at the time of manufacturing the printing apparatus 1 or in an installation process of the printing apparatus 1, determine the network transfer speed N based on that measurement result and then calculate L, store L in the ROM 212 of the controller 210 or the ROM 232 of the print head control board 230, and reference L from the program. Alternatively, a configuration in which these are combined or selectable may be taken.

Figure 4:
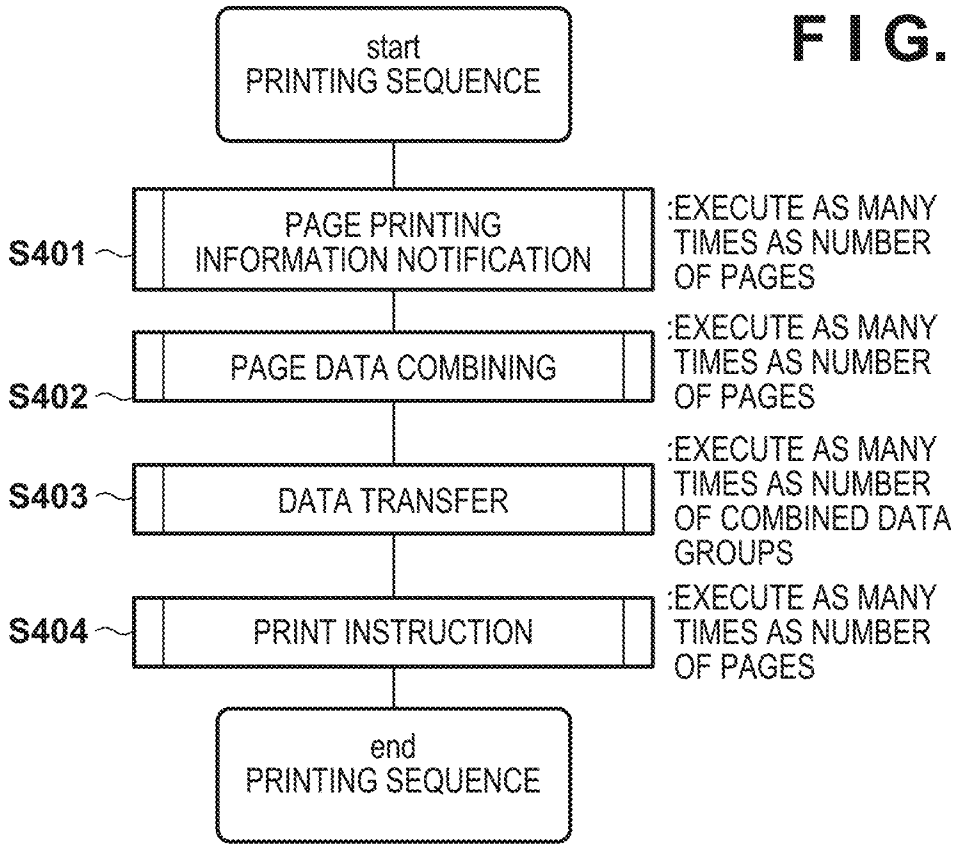
FIG. 4 is a diagram illustrating a flow of processing of a printing sequence.

A printing sequence in the data flow control of the present embodiment will be described with reference to FIG. 4. FIG. 4 illustrates a printing sequence of the data flow control for which execution is started in step S301 of FIG. 3. The sequence of FIG. 4 is executed in the controller 210. In FIG. 4, roughly four processes are executed. That is, page printing information notification processing of step S401, page data combining processing of step S402, data transfer processing of step S403, and print instruction processing of step S404 are executed. The controller 210 executes, for steps S401, S402, and S404, as many times of processing as the number of pages and executes, for step S403, as many times of processing as the number of combined data groups. Although each process is performed in order for each page, each process may be processed in parallel in a separate thread. For example, a configuration may be taken so as to perform, while executing page data combining processing of step S402 for the 10th page, page printing information notification processing of step S401 for the 100th page in parallel. The processes of steps S401 to S404 will be described in detail below.

Figure 5:
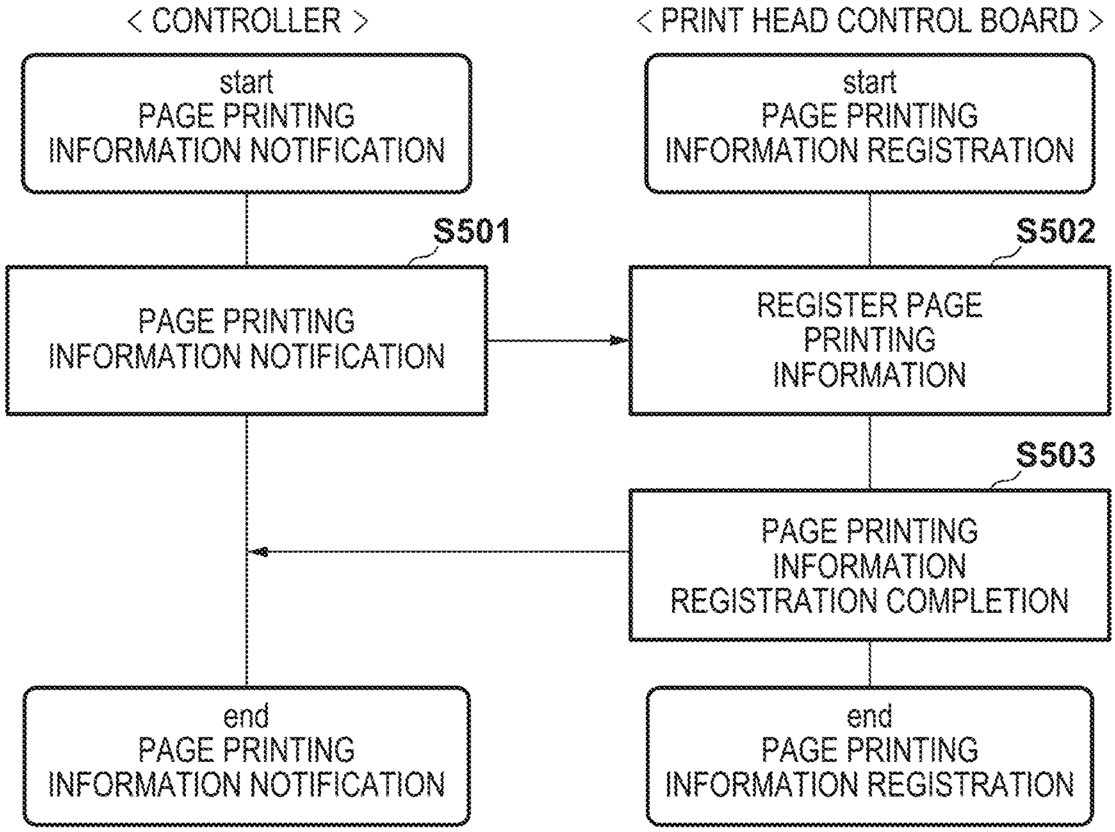
FIG. 5 is a diagram illustrating a printing sequence among pieces of control hardware.

FIG. 5 is a diagram illustrating the processing of step S401 in detail. As illustrated in FIG. 5, the page printing information notification processing of step S401 is processing that is coordinated between the controller 210 and the print head control board 230. In step S501, the controller 210 transmits a page printing information notification to the print head control board 230. The information transmitted as the printing information notification here is print setting information on a page basis and is information such as the size and resolution of an image, color information, and whether correction processing is necessary, for example. In step S502, upon receiving the printing information notification, the print head control board 230 registers and holds the page printing information. The page printing information is the above print setting information on a page basis. In step S503, upon completing registration of the page printing information, the print head control board 230 transmits a registration completion notification to the controller 210.

Figure 6:
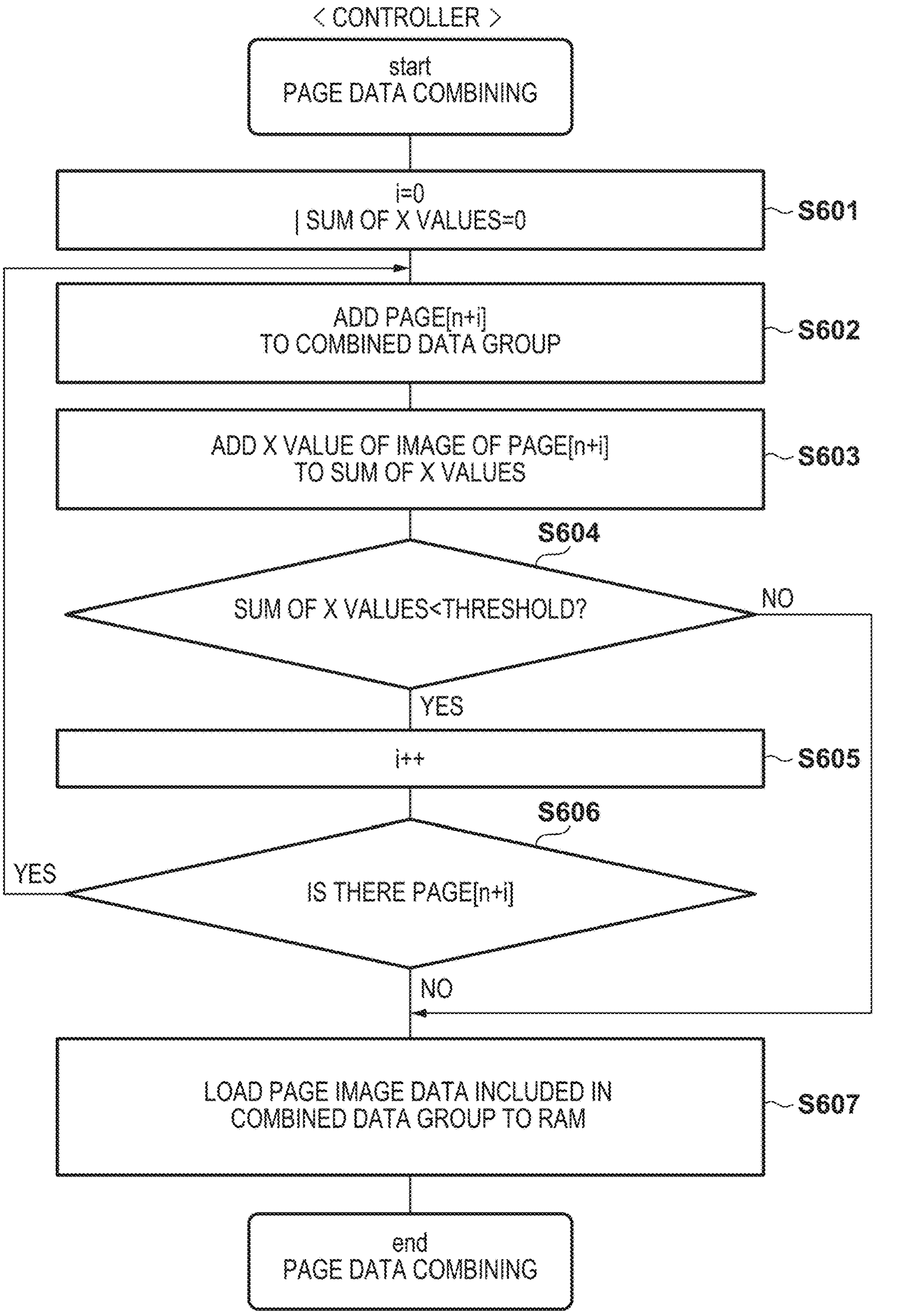
FIG. 6 is a diagram illustrating a printing sequence among pieces of control hardware.

FIG. 6 is a diagram illustrating the processing of step S402 in detail. The processing of FIG. 6 is processing to be executed by the controller 210 and is processing for forming a combined data group described above. In addition, n in the drawing is a page number at the start of execution of this sequence. In step S601, the controller 210 initializes processing variables and initializes a variable for storing the sum of X values. In step S602, the controller 210 adds a page [n+i] to a combined data group. For example, when step S602 is performed for the first time, the first page is added to the combined data group.

In step S603, the controller 210 adds the X value of the page [n+i] to the sum of X values. As described above, the X value is a lengthwise length of page image data. In step S604, the controller 210 determines whether the sum of X values is less than a threshold. Here, the threshold is the L value of the underrun avoidance condition described above or the value Lm obtained by adding a margin to the L value. In step S604, if it is determined to be less than the threshold, the processing proceeds to step S605, and if it is determined to be not less than the threshold, that is, greater than or equal to the threshold, the processing proceeds to step S607.

In step S605, the controller 210 increments the variable i and proceeds to step S606. In step S606, the controller 210 determines whether there is a page [n+i] after the increment of the variable i. That is, if the page currently being processed is not the last page, it is determined that there is a page [n+i] after the increment of the variable i, and the processing is repeated from step S602. Meanwhile, if the page currently being processed is the last page, it is determined that there is no page [n+i] after the increment of the variable i, and the processing proceeds to step S607.

In step S607, the controller 210 loads pieces of page image data included in the combined data group and combines and arranges them in a print page order in a contiguous memory space of the RAM 215. Then, the processing of FIG. 6 ends. With the above processing, a combined data group that satisfies the underrun avoidance condition or includes the final page is formed, and combined page image data included in the combined data group is prepared in the RAM 215.

Figure 7:
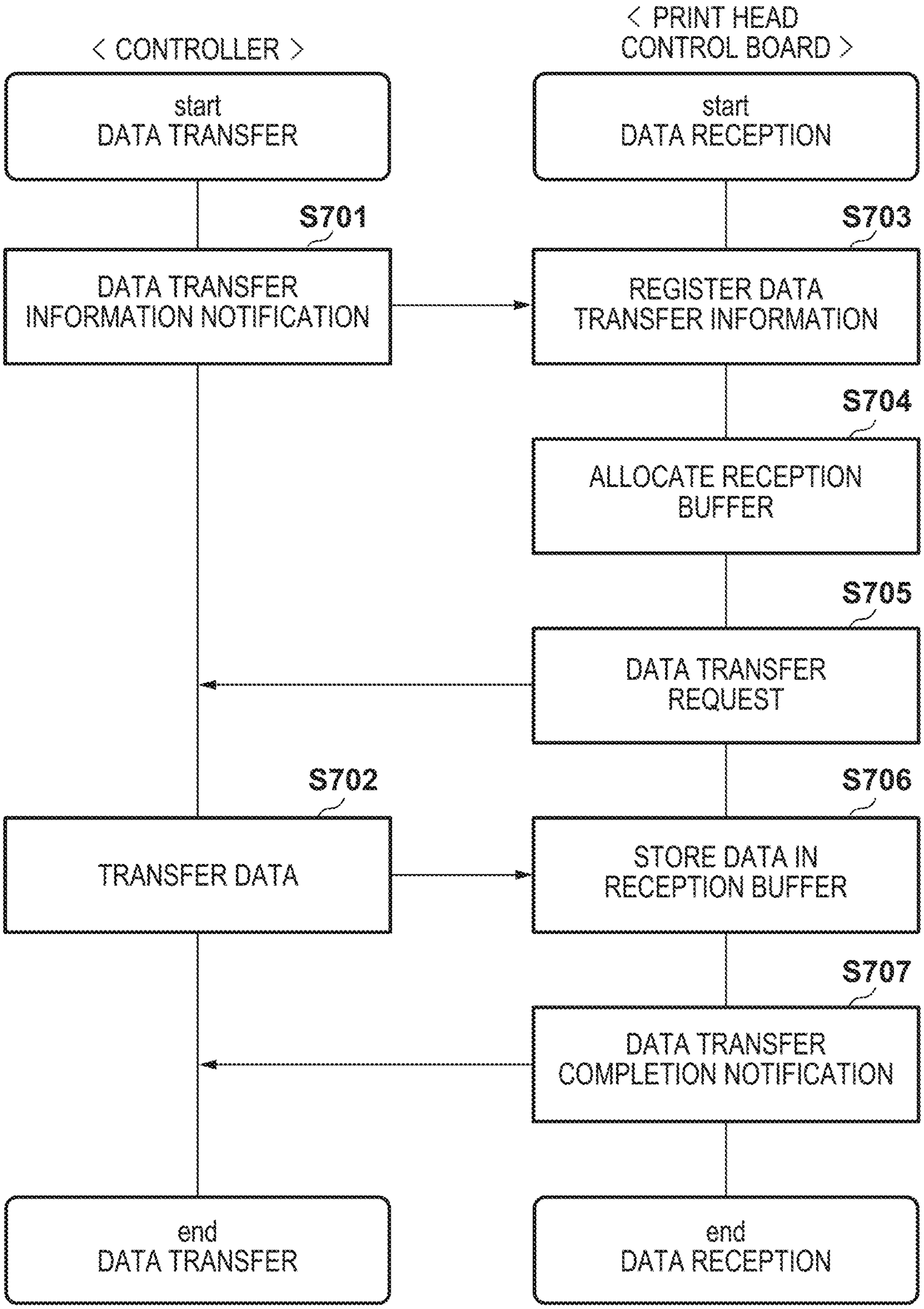
FIG. 7 is a diagram illustrating a printing sequence among pieces of control hardware.

FIG. 7 is a diagram illustrating the processing of step S403 in detail. As illustrated in FIG. 7, step S403 is processing that is coordinated between the controller 210 and the print head control board 230. In step S701, the controller 210 transmits a data transfer information notification to the print head control board 230. Here, the data transfer information notification includes information (data transfer information) of pages included in a combined data group for which data transfer is to be performed hereafter.

In step S703, the print head control board 230 registers and holds the data transfer information and allocates a region of the received data buffer based on the data transfer information. Here, the data size for which to allocate a region is determined by calculating the total size of the combined data group based on the information of the image data size of each page received in the sequence of FIG. 5, for example. It is possible that the amount of usage of the received data buffer region may reach a full size during printing, and in that case, the progress of processing of step S703 waits until printing progresses, data is processed, and a region can be allocated. When the region allocation is completed, the processing proceeds to step S705, and the print head control board 230 transmits a data transfer request notification to the controller 210.

Upon receiving the data transfer request notification, in step S702 the controller 210 performs data transfer to the print head control board 230. In the data transfer here, the combined data of the combined data group for which transfer preparation has been performed in the processing of FIG. 6 is transferred. In step S706, upon receiving the data, the print head control board 230 stores the received data in the received data buffer region and, in step S707, transmits a data transfer completion notification to the controller 210 in S707.

Figure 8:
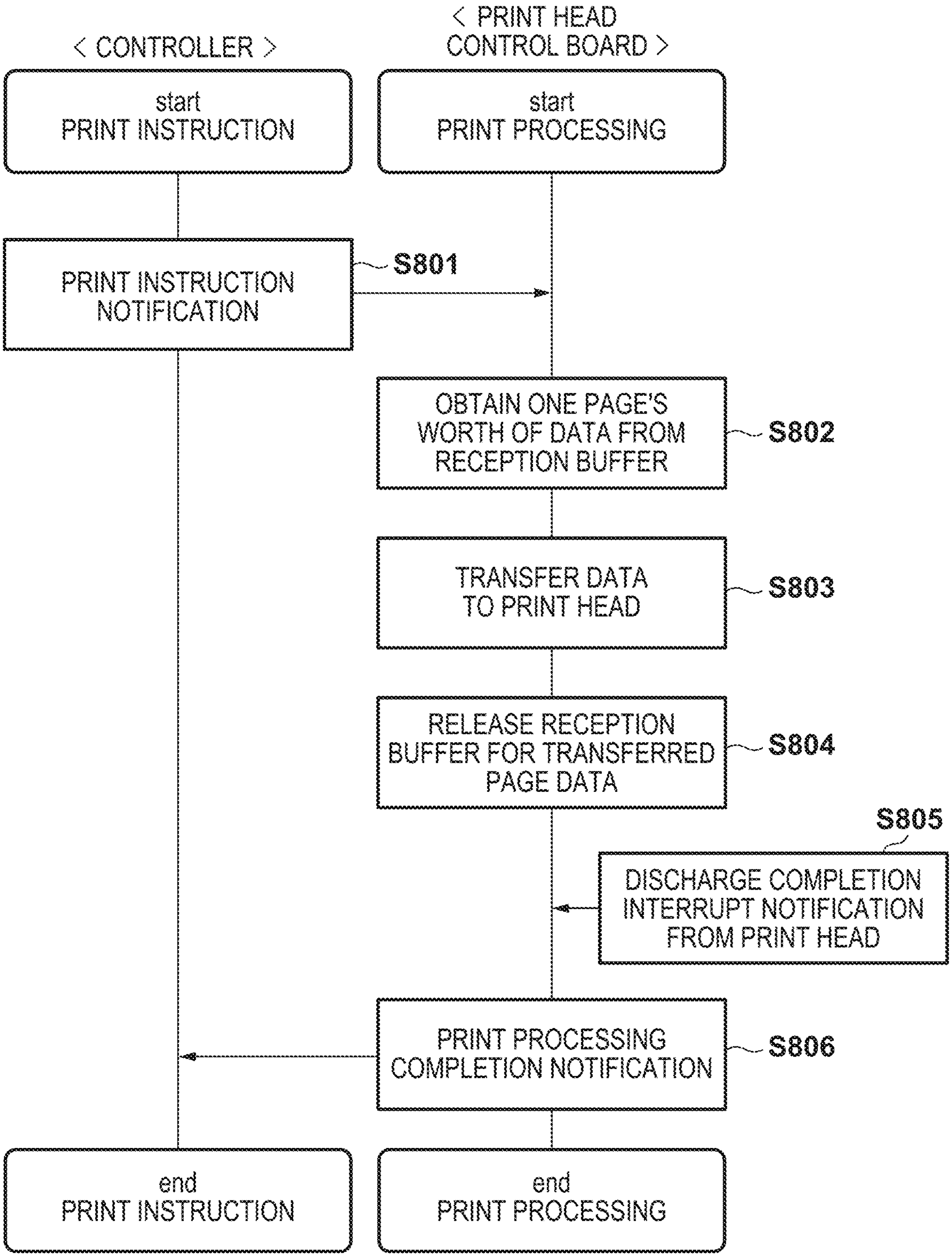
FIG. 8 is a diagram illustrating a printing sequence among pieces of control hardware.

FIG. 8 is a diagram illustrating the processing of step S404 in detail. As illustrated in FIG. 8, step S404 is processing that is coordinated between the controller 210 and the print head control board 230. In step S801, the controller 210 transmits a print instruction notification to the print head control board 230. The print instruction notification is transmitted on a page basis and contains information about a corresponding page. In step S802, upon receiving the print instruction notification, the print head control board 230 separates and obtains the page image data of a corresponding page from the received data buffer region, using the information of the image data size of one page of the corresponding page registered in step S502. Then, in step S803, the print head control board 230 performs data transfer to the print head 280. In step S804, the print head control board 230 performs processing for releasing the received data buffer region after data transfer. In the present embodiment, after transfer to the print head 280, a print start trigger signal is delivered from the conveyance mechanism 250 according to a sheet conveyance timing. Upon receiving the print start trigger signal, the print head 280 performs image formation by performing ink discharge. Upon completion of ink discharge for one page, in step S805, the print head 280 transmits an interrupt notification to the print head control board 230. In step S806, upon receiving the interrupt notification, the print head control board 230 transmits a print processing completion notification to the controller 210. The print processing completion notification corresponds to the processing of step S305 of FIG. 3.

By executing the above processing for each page, it is possible to print all pages while avoiding an underrun. In addition, the print instruction notification transmission and print processing sequence illustrated in FIG. 8 is performed on a page basis. Therefore, even if page image data is combined, control and management for interruption of printing and processing for resuming printing thereafter and billing, for example, can be performed on a page basis.

In the present embodiment, the printing apparatus 1 includes a line-type print head 280 but is not limited thereto and may be a printing apparatus including a so-called serial-type print head capable of moving back and forth in a direction orthogonal to a sheet conveyance direction. Further, each process of the printing sequence is described in the present embodiment to be mainly executed by a software program but is not limited thereto and may be implemented in hardware such as an ASIC or a Field Programmable Gate Array (FPGA) that serve the same functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-166223, filed Sep. 27, 2023, which is hereby incorporated by reference herein in its entirety.

What is claimed is:

1. A printing system comprising: a data controller; and a printing controller, the data controller including:

at least one processor and at least a memory coupled to the at least one processor and having instructions stored thereon, and when executed by the at least one processor, acting as:

a transmission control unit configured to set, as a group, a piece of image data corresponding to a predetermined unit so as to satisfy a condition and perform transmission control for transmitting data corresponding to the group to the printing controller, wherein the condition is that a size of an image in a conveyance direction is greater than or equal to a threshold, and the printing controller including:

at least one processor and at least a memory coupled to the at least one processor and having instructions stored thereon, and when executed by the at least one processor, acting as:

a storage unit configured to receive the data corresponding to the group from the data controller and store the data corresponding to the group in a buffer region;

an obtaining unit configured to obtain the piece of image data from the data corresponding to the group stored in the buffer region; and a print control unit configured to perform printing control for causing a printing unit to perform printing based on the piece of image data obtained by the obtaining unit.

2. The printing system according to claim 1, wherein the transmission control unit sets, as a group, pieces of image data, each corresponding to the predetermined unit, by repeating combining of the pieces of image data with each other until the condition is satisfied.

3. The printing system according to claim 2, wherein in a case where pieces of image data, each corresponding to the predetermined unit, cannot be combined with each other, the transmission control unit transmits a corresponding piece of image data to the printing controller even if the condition is not satisfied.

4. The printing system according to claim 3, wherein the case where pieces of image data, each corresponding to the predetermined unit, cannot be combined with each other is a case where a corresponding piece of image data is a last page.

5. The printing system according to claim 1, wherein the threshold is a value defined based on a processing time associated with the transmission control for the piece of image data and a processing time associated with the printing control for the piece of image data.

6. The printing system according to claim 5, wherein the threshold is a value based on the processing time associated with the transmission control for the piece of image data not being longer than the processing time associated with the printing control for the piece of image data.

7. The printing system according to claim 5, wherein the threshold is a value derived from a relational expression for the processing time associated with the transmission control for the piece of image data and the processing time associated with the printing control for the piece of image data.

8. The printing system according to claim 5, wherein the threshold is a value for which a margin has been included into a value derived from a relational expression for the processing time associated with the transmission control for the piece of image data and the processing time associated with the printing control for the piece of image data.

9. The printing system according to claim 5, wherein the processing time associated with the transmission control includes a time for communication between the data controller and the printing controller and a processing time for transmitting the piece of image data.

10. The printing system according to claim 9, wherein the time for communication is measured when the transmission control by the transmission control unit is performed.

11. The printing system according to claim 5, wherein the processing time associated with the printing control includes a time for conveying a sheet on which the piece of image data is to be printed.

12. The printing system according to claim 1, wherein the condition is a condition for preventing an underrun from occurring.

13. The printing system according to claim 1, wherein the transmission control unit transmits information of the piece of image data included in the data corresponding to the group to the printing controller.

14. The printing system according to claim 13, wherein the information of the piece of image data includes a size of an image in a conveyance direction.

15. The printing system according to claim 13, wherein the transmission of the information of the piece of image data included in the data corresponding to the group is performed before the transmission of the data corresponding to the group.

16. The printing system according to claim 13, wherein the obtaining unit obtains the piece of image data from the data corresponding to the group stored in the buffer region based on the information of the piece of image data transmitted from the data controller.

17. The printing system according to claim 13, wherein the printing performed by the printing unit is variable printing.

18. The printing system according to claim 17, wherein the printing performed by the printing unit is performed on rolled paper.

19. The printing system according to claim 1, wherein the predetermined unit is a page.

20. The printing system according to claim 1, wherein the data controller and the printing controller are included in a printing apparatus.

21. The printing system according to claim 20, wherein the transmission control unit transmits the data corresponding to the group via an internal bus of the printing apparatus.

22. The printing system according to claim 1, wherein the data controller is included in an information processing apparatus and the printing controller is included in a printing apparatus.

23. The printing system according to claim 22, wherein the transmission control unit transmits the data corresponding to the group via a network.

24. A method to be executed in a printing system including a data controller; and a printing controller, the method comprising:

the data controller setting, as a group, a piece of image data corresponding to a predetermined unit so as to satisfy a condition and performing transmission control for transmitting data corresponding to the group to the printing controller, wherein the condition is that a size of an image in a conveyance direction is greater than or equal to a threshold, and the printing controller receiving the data corresponding to the group from the data controller and storing the data corresponding to the group in a buffer region;

obtaining the piece of image data from the data corresponding to the group stored in the buffer region; and performing printing control for causing a printing unit to perform printing based on the obtained piece of image data.

25. A non-transitory computer-readable storage medium that stores one or more programs including instructions, which when executed by one or more processors of an information processing apparatus, cause the information processing apparatus to perform a method, the method comprising:

a data controller setting, as a group, a piece of image data corresponding to a predetermined unit so as to satisfy a condition and performing transmission control for transmitting data corresponding to the group to the printing controller, wherein the condition is that a size of an image in a conveyance direction is greater than or equal to a threshold, and a printing controller receiving the data corresponding to the group from the data controller and storing the data corresponding to the group in a buffer region;

obtaining the piece of image data from the data stored corresponding to the group in the buffer region; and performing printing control for causing a printing unit to perform printing based on the obtained piece of image data.

* * * * *